United States Patent [19]

Miller et al.

[11] Patent Number: 5,359,858
[45] Date of Patent: Nov. 1, 1994

[54] METHOD AND APPARATUS FOR FREEZING AQUEOUS LIQUID

[76] Inventors: Jeremy P. Miller, Caxton House, Victoria Road, Mortimer, Nr. Reading, Berkshire RG7 3SL; Charles M. Monroe, 24 Queen Street, High Wycombe, Buckinghamshire HP13 6EZ, both of United Kingdom

[21] Appl. No.: 89,071

[22] Filed: Jul. 7, 1993

[30] Foreign Application Priority Data

Jul. 7, 1992 [GB] United Kingdom ............... 9214427.8

[51] Int. Cl.$^5$ .............................................. F25C 1/12
[52] U.S. Cl. ............................................ 62/71; 62/345
[58] Field of Search ................ 62/345, 353, 356, 71

[56] References Cited

U.S. PATENT DOCUMENTS

| | | | |
|---|---|---|---|
| 3,403,568 | 9/1968 | Kamin et al. | 62/345 X |
| 3,618,334 | 11/1971 | Gram | 62/345 |
| 4,324,108 | 4/1982 | Billett et al. | 62/345 |
| 4,335,583 | 6/1982 | Billett | 62/345 |

Primary Examiner—William E. Tapolcal

[57] ABSTRACT

A method of freezing aqueous liquids which method comprises the steps of:
  a) introducing the aqueous liquid into a mould;
  b) allowing at least the aqueous liquid in contact with said mould to freeze; and
  c) releasing said frozen liquid from said mould; wherein said method further comprises the step of:
  d) pre-cooling said mould to a temperature such that the frozen aqueous liquid can be readily released from said mould as a unitary structure.

16 Claims, 5 Drawing Sheets

METHOD AND APPARATUS FOR FREEZING AQUEOUS LIQUID

FIELD OF THE INVENTION

This invention relates to a method and apparatus for freezing aqueous liquids and, more particularly but not exclusively, is concerned with a method and apparatus for freezing ice lollies.

BACKGROUND OF THE INVENTION

In the production of ice lollies a flavoured liquid is poured into moulds each comprising several hundred cavities. The moulds are then placed inside a refrigerator and left until the flavoured liquid has frozen throughout. The moulds are then removed from the refrigerator and inverted. A stream of warm air is then blown onto the back of the moulds to melt the outer surface of the lollies. As the surface melts the lollies slide downwardly out of their respective cavities.

It will be appreciated that the application of warm air requires heat to be applied to the moulds which then has to be taken out when the moulds are subsequently cooled. Furthermore, any sculptured features in the lollies become blurred and ill defined due to surface melting.

Various means have been tried to facilitate removal of the lollies from their moulds without warming. Such means include coating the surface of the mould with a low friction coating, for example TEFLON (RTM), and coating the mould with an organic release agent. These attempts have however been totally unsuccessful.

SUMMARY OF THE INVENTION

We have discovered that there is a direct correlation between the rate at which an aqueous solution is cooled and the propensity of the frozen liquid to adhere to a surface. In particular, as the rate at which liquid is frozen is increased the tendency of the frozen liquid to adhere to a surface decreases. This was somewhat unexpected since in "The Friction and Lubrication of Solids", Part II, Chapter VIII, Oxford University Press, Messrs. Bowden and Tabor observed that when a liquid was frozen in contact with a block the adhesion between the frozen liquid and the block increased as the temperature decreased.

In the case of ice lollies, we have found that if the initial rate of cooling is sufficient the moulds can simply be turned over and the frozen lollies fall out (a small tap sometimes being necessary).

This has significant energy and throughput consequences. In particular, energy does not have to be wasted heating the moulds to release the lollies and then re-cooling the moulds. Furthermore, time does not have to be wasted heating the moulds.

There is however a second consideration. In particular, if the initial rate of cooling is too high the lollies crack as they freeze and the product leaves the mould in several pieces.

It will be appreciated that the present invention is not limited to the production of ice lollies and is equally applicable to all aqueous products and, in particular, water containing foodstuffs including chocolate ices. It is also applicable to the freezing of water containing pharmaceutical products.

WO/90 06693 discloses that the adhesion of water containing goods to a conveyor belt can be reduced by pre-cooling the conveyor before the water containing goods are brought into contact with the conveyor. However, the disclosure does not specifically address the production of ice lollies and does not recognise that there is only a narrow band of temperatures over which easy release can be obtained with lack of structural damage.

According to one aspect of the present invention there is provided a method of freezing an aqueous liquid which method comprises the steps of:

a) introducing the aqueous liquid into a mould;

b) allowing at least the aqueous liquid in contact with said mould to freeze; and c) releasing frozen aqueous liquid from said mould;

characterized in that said method further comprises the step of:

d) pre-cooling said mould to a temperature such that the frozen aqueous liquid can be readily released from said mould as a unitary structure.

Preferably, at least the surface of the mould intended to contact the aqueous liquid is pre-cooled to a temperature at or colder than $-50°$ C., preferably at or colder than $-60°$ C, and advantageously between $-70°$ and $-80°$ C.

Advantageously, the surface of the mould intended to contact the aqueous liquid is NOT cooled below $-85°$ C. and preferably not below $-80°$ C. to inhibit structural damage to the frozen product.

Because of the necessity to warm prior art moulds it has been customary to make the moulds of relatively thin material, for example aluminium or stainless steel with an average thickness of about 0.5 mm. In contrast, moulds for carrying out the present invention preferably have a relatively high thermal capacity to ensure sufficiently rapid cooling. Typically, the moulds will be made from aluminium or stainless steel and will have an average wall thickness of at least 1 mm, and preferably at least 2 mm.

If desired, the moulds may contain passageways for the passage of a coolant therethrough.

The aqueous liquid can simply be flavoured water or may comprise a viscous liquid, for example chocolate.

The aqueous liquid may be allowed to remain in the mould until frozen throughout. However, in the preparation of certain delicacies a charge of viscous chocolate may be poured into a mould, the surface of the chocolate frozen and the mould carefully inverted to allow the unfrozen aqueous liquid to flow from the mould. A different liquid or pasty product may then be poured into the crust and the whole allowed to freeze throughout before inversion of the mould and release of the contents with a sharp tap on the mould. It should be noted that careful temperature control is necessary in this process to ensure that there is a little adhesion between the chocolate and the moulds so that the crusts do not fall out of their cavities during the first inversion.

The present invention also provides an apparatus for carrying out a method in accordance with the invention, which apparatus comprises a mould made from thermally conductive material and having an average thickness of at least 1 mm.

Reference is made to "average thickness" as moulds with fins designed to create features in the surface of the ice lollies are known. However, the distribution of such fins in moulds known to the inventors is sparse.

Preferably, said average thickness is at least 2 mm.

Advantageously, said thermally conductive material is selected from the group comprising stainless steel, copper, aluminium, brass and mixtures thereof.

Preferably, said mould has at least one passage to allow a cryogen to pass therethrough.

In one embodiment, said apparatus comprises a vessel, a mould having a plurality of cavities dividing said vessel into an upper portion and a lower portion, means to admit a coolant into said lower portion, means to withdraw coolant from said lower portion, means for filling said cavities with ice lolly solution, means for moving said cavities, means for inserting sticks into said cavities downstream of said filling means, and means for withdrawing frozen ice lollies from said cavities, and means for cooling said coolant with liquid nitrogen.

If desired, said cavities may, in use, be cooled by partial immersion in said coolant. Alternatively, means may be provided for spraying coolant against said cavities.

In a particularly preferred embodiment, the coolant is only used for part of the manufacturing cycle, the balance of the refrigeration being provided by a mechanical refrigeration unit. In such an embodiment the coolant might be used for pre-cooling the moulds and, optionally, during one or more of the following steps:

1. filling the cavities, and
2. initial cooling after filling.

Preferably, said apparatus includes means for introducing nitrogen from said cooling means into the upper portion of said vessel.

Advantageously, said means for moving said cavities comprises a stepping motor.

In another embodiment, said apparatus comprises a tunnel, a mould in the form of a continuous belt mounted in said tunnel, said mould having a plurality of cavities therein, means to admit a coolant into said tunnel, means for filling said cavities with ice lolly solution, means for moving said cavities and means for inserting sticks into said cavities downstream of said filling means.

For a better understanding of the invention reference will now be made to the following Examples and the accompanying drawings, in which:

EXAMPLE 1

A multi-cavity mould of stainless steel approximately 2 mm in thickness and at room temperature was filled with a solution of 10% (by volume) gelatin in water. The mould was placed in a mechanical refrigerator at −20° C. and left for 4 hours to freeze throughout.

On inversion of the mould the lollies remained fast in the mould and could not be removed even when the mould was tapped with a small hammer.

EXAMPLE 2

The procedure of Example 1 was repeated but using solid carbon dioxide at −50° C. as the refrigerant. Again the lollies could not be extracted from the mould.

EXAMPLE 3

The procedure of Example 1 was repeated except the mould was cooled by being lowered into a bath of liquid nitrogen at −196° C. On inverting the mould the lollies remained in place. They also remained in place even when the mould was tapped vigorously.

EXAMPLE 4

The procedure of Example 2 was repeated except that the mould was pre-cooled to −50° C. prior to adding the liquid. The lollies did not fall out of the moulds on inversion but did fall out when the mould was tapped firmly.

EXAMPLE 5

The procedure of Example 1 was repeated except that the mould was pre-cooled to −70° C. by exposure to vapour from liquid nitrogen. On inverting the mould some of the lollies dropped straight out and the remainder fell out when the mould was tapped.

EXAMPLE 6

The procedure of Example 5 was repeated except the mould was replaced by a mould of stainless steel having a wall thickness of 1 mm. On inverting the mould most of the lollies dropped straight out and the remainder followed on gently tapping the back of the mould.

From the above Examples we deduced that the rate at which heat is extracted from the liquid is critical. It will be noted that although the mould in Example 3 was plunged in liquid nitrogen (−196° C.) the cooling raze was inadequate.

Clearly, from Examples 1 to 3 the cooling rate was too low whilst in Example 4 to 6 the cooling rate was sufficient.

Figure 1:
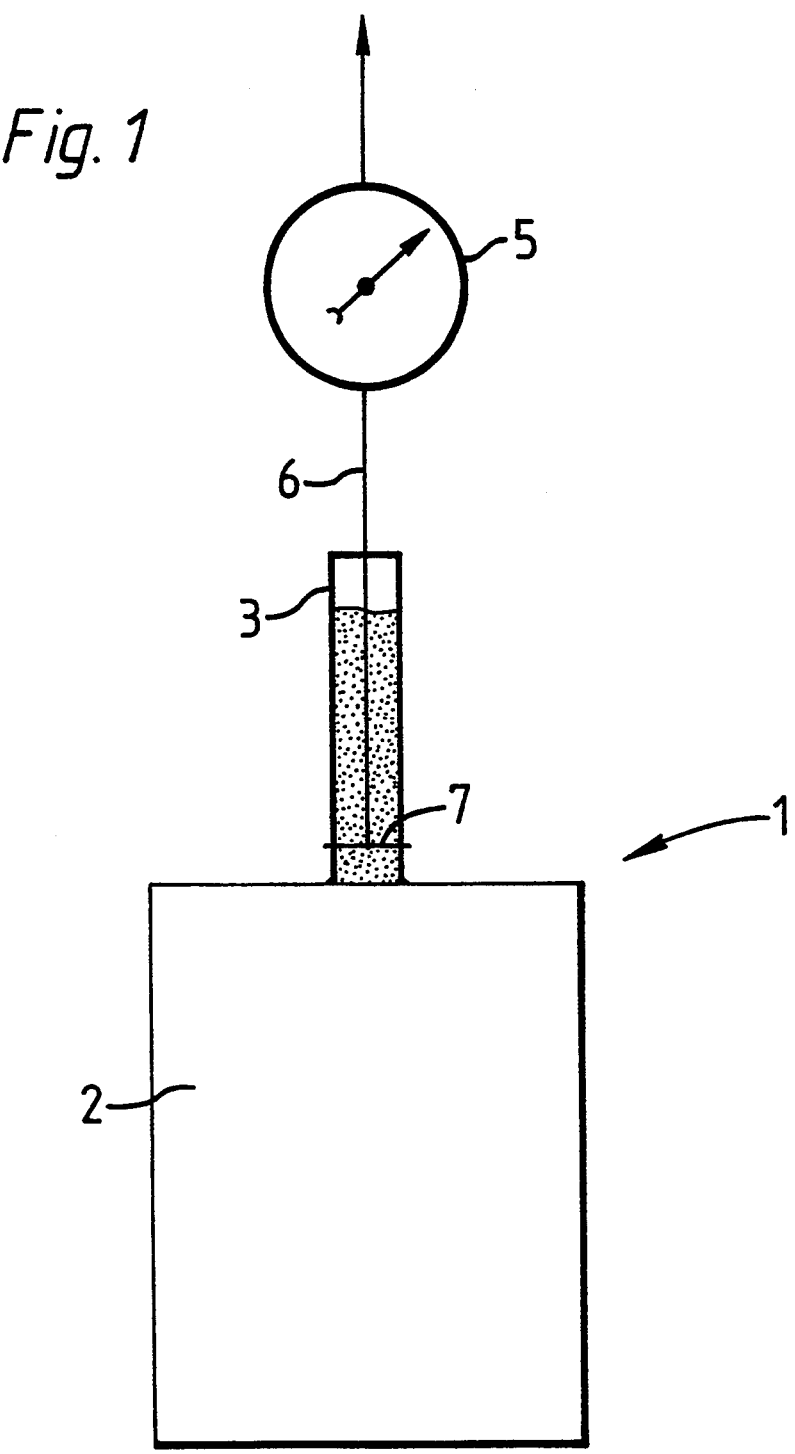
FIG. 1 is a schematic drawing of our test apparatus.

To test our hypothesis the apparatus shown FIG. 1 was constructed. The apparatus, which is generally identified by reference numeral 1 comprised a brass block 2 weighing approximately 1.5 kg; a tube 3 of plastics material 12 mm in diameter; a spring balance 5; a tension wire 6 and a rod 7 which projected through holes in the tube 3 as shown, In use, brass block 2 was placed in a refrigerator set to a particular temperature for several hours until the brass block 2 was at a uniform temperature throughout, The brass block 2 was then removed from the refrigerator and the tube 3, complete with the rod 7 and tension wire placed thereon.

5 ml of an aqueous solution of 10% gelatin (by volume) was then poured into the tube 3, The arrangement was then returned to the refrigerator and left for several hours for the solution to freeze throughout.

Figure 2:
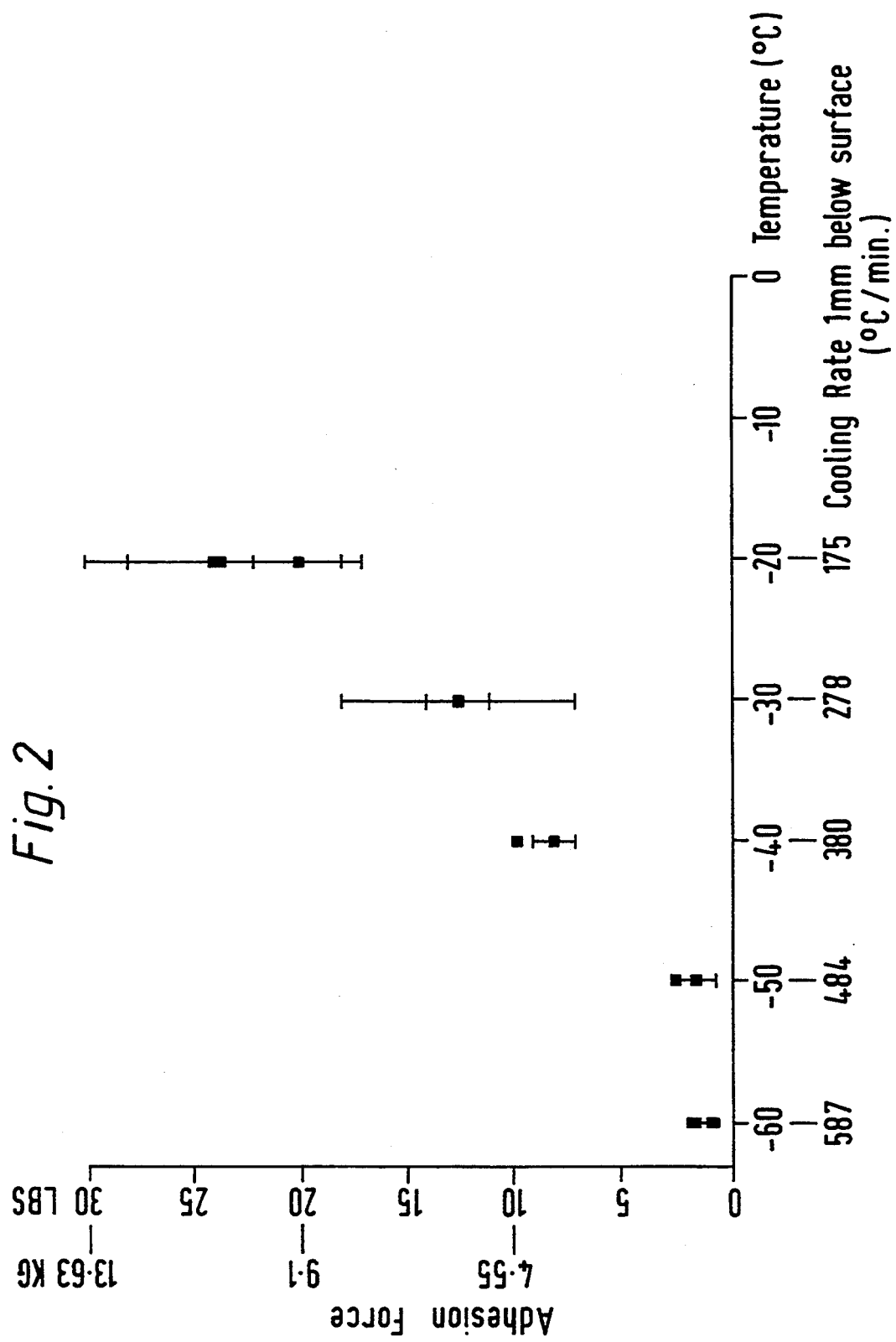
FIG. 2 is a graph showing the effect of precooling on adhesion.

On removal from the refrigerator the tension wire was connected to the spring balance 5 which was raised slowly until the frozen solution separated from the brass block 2, The maximum reading of the spring balance 5 was recorded, The procedure was repeated several times at various temperatures and the adhesive force (the reading on the spring balance 5 less the weight of the lifted mass) recorded, The results are shown in FIG. 2, It will be noted that although there is a spread in the results, particularly at higher temperatures, the adhesive force reduced very substantially as the temperature of the brass block 1 was lowered.

When the brass block 1 was pre-cooled to −70° C. no adhesive force could be measured with the spring balance 5.

In view of the work of Bowden and Tabor we concluded that low temperature itself is not the determining factor but the RATE of cooling. It will be appreciated that in the experiments described above the 1.5 kg mass of the brass block 2 was sufficient to provide an essentially constant temperature source for freezing.

The calculated cooling rate in the liquid 1 mm from the interface between the liquid and the mould has been indicated in FIG. 2. It will be seen that at a cooling rate of greater than 650° C./min the adhesion is minimal. Transferring the above data into the commercial freezing of ice lollies it should be recalled that when the moulds are inverted the ice lollies have a certain mass. However, and far more significantly, if the moulds are pivotally mounted and are allowed to drop against a bar when the mould is inverted the impact will release the ice lollies even though they adhere to some extent to the moulds.

Quite acceptable cooling rates 1 mm beneath the surface would be of the order of 650° to 750° C./min.

As indicated above the cooling rate need only be sustained sufficiently long to ensure the formation of a frozen crust and the internal freezing can proceed at a more leisurely pace if desired.

Obviously, the rate of cooling sustained must be sufficient so that the heat remaining in the liquid does not melt the frozen crust. The heat transfer rate to be sustained depends on the thermal conductivity of the liquid, for example an aerated ice cream has far lower thermal conductivity than a sugar solution for making ice lollies.

An interesting advantage of the present invention is that whereas the shape and configuration of features on the surface of lollies removed from conventional warm air released moulds is generally blurred, the features on the surface of lollies frozen in accordance with the invention is extremely sharp. In this connection, ice lollies and chocolate ices in the shape of animals, birds and figures are becoming increasingly popular. Such shapes are made using moulds having parts which can be physically separated to release the frozen product.

The present invention envisages a mould which, unlike prior art moulds, which are relatively thin, is relatively thick and has channels therein for the passage of a cryogen therethrough. However, for high production rates it may be preferable to either partially submerge the moulds in a liquid cryogen or spray them with liquid cryogen.

Whilst we would strongly recommend liquid nitrogen as the source of pre-cooling the moulds other cryogens could also be used. Solid carbon dioxide might commercially be used although the majority of normal refrigerators would not lower the temperature of the moulds sufficiently to be effective in a commercial environment without the use of complex energy expensive refrigeration systems.

Whilst Examples 1 to 6 clearly show the importance of pre-cooling the moulds to facilitate release, further work has shown that if the moulds are excessively pre-cooled then the frozen product is liable to suffer structural damage.

EXAMPLE 7

A mould of stainless steel approximately 2 mm in thickness was placed in a liquid nitrogen refrigerator set to −90° C. overnight so that it had a uniform temperature of −90° C. The mould was intended for making rocket shaped ice lollies having a cylindrical body approximately 10 cm long and 12 mm in diameter.

A solution of 10% (by volume) gelatin in water was introduced into the mould. The water rapidly froze. However, during freezing there was a sharp audible crack. When the mould was inverted about two-thirds of the body fell out followed by the top one-third as a separate and distinct piece. The product was thus unmarketable.

EXAMPLE 8

The procedure of Example 7 was repeated several times except the mould was pre-cooled to −85° C. The results at this temperature were varied. Seven samples broke in two with a muted crack. Five samples appeared quite satisfactory.

EXAMPLE 9

The procedure of Example 7 was repeated several times except the mould was pre-cooled to −80° C. All the ice lollies produced were found to be structurally sound.

From the results of Examples 7 to 9 it is clear that excessively rapid cooling is undesirable. It is anticipated that the lowest temperature to which a mould can be pre-cooled may vary a little according to the composition of the aqueous product.

In the commercial production of ice lollies using one know machine, the moulds are partially filled with liquid at a filling station. The sticks are then lowered into the cavities and held in position until the ice lollies are frozen throughout. The moulds are then warmed and the ice lollies lifted out of their cavities by their sticks when the moulds have been warmed sufficiently.

When adapting this production technique for the present invention we have noted that when the sticks are inserted into the aqueous liquid part of the liquid is displaced and comes into contact with the wall of the cavity.

It is particularly important to ensure that the mould has sufficient thermal conductivity to ensure that this displaced liquid is sufficiently rapidly cooled when it comes into contact with the wall of the cavity that it does not materially adhere thereto.

During the manufacture of ice lollies, the aqueous liquid is typically pre-cooled to close to its freezing point prior to being introduced into the moulds. The whole conventional process from introduction of the aqueous liquid to withdrawal of the frozen ice lollies typically takes about 4 minutes. In contrast, the present invention typically reduces this time by nearly one half.

It will be noted that accurate temperature control is important to the success of the present invention and it is recommended that the moulds themselves be cooled by a liquid such as DOWTHERM (RTM), methanol or SYLTHERM XLT (RTM) whose waxing temperatures are −73° C., −85° C. and −110° C. respectively. The liquid itself should be cooled by direct or indirect heat exchange with liquid nitrogen.

Figure 3:
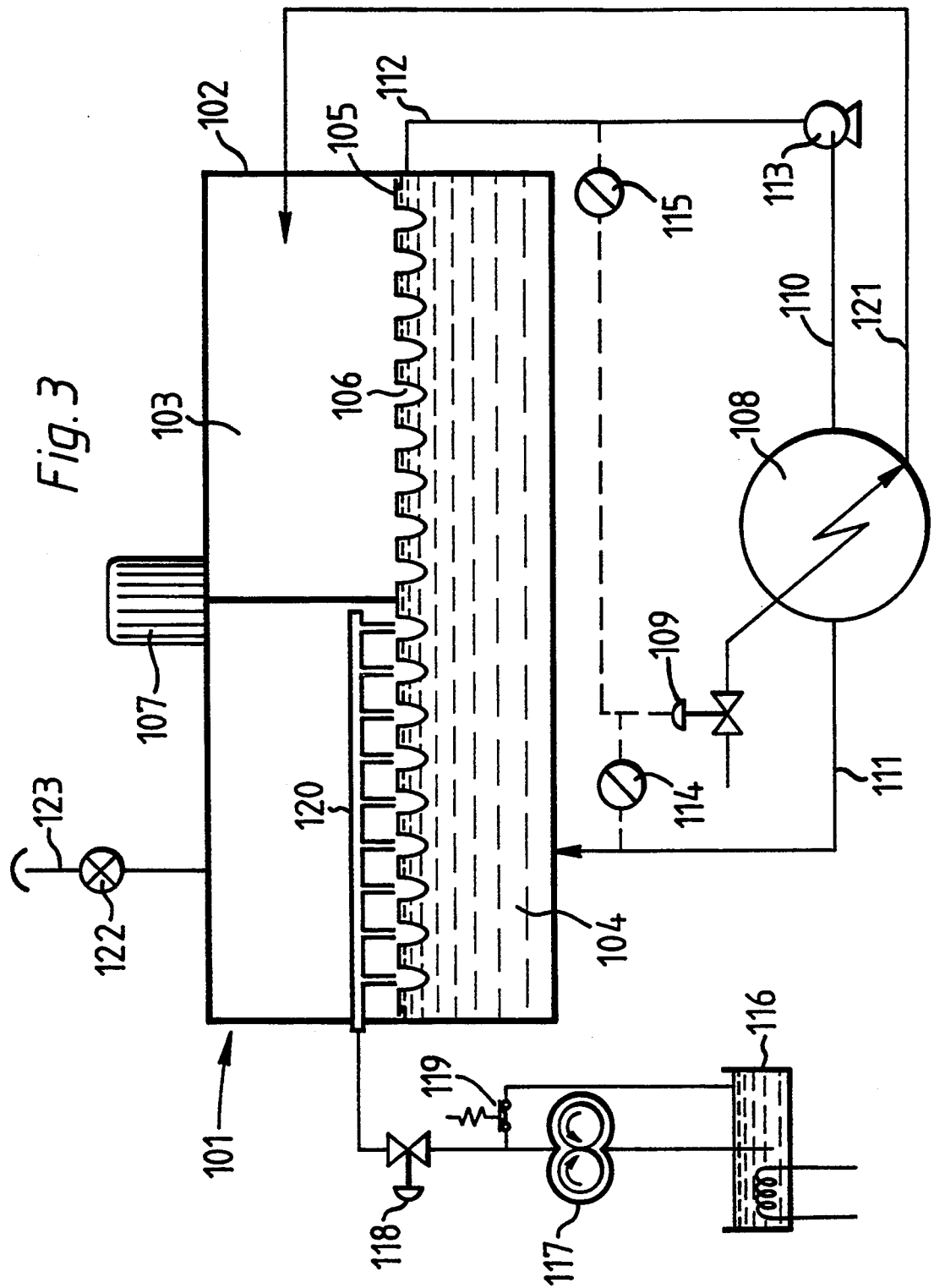
FIG. 3 is a schematic vertical cross-section through one embodiment of an apparatus in accordance with the invention.

Referring now to FIG. 3 there is shown an apparatus for the continuous production of ice lollies. The apparatus, which is generally identified by reference numeral 101 comprises a vessel 102 which is divided into an upper portion 103 and a lower portion 104 by a mould 105 containing a multiplicity of cavities 106.

The mould 105 is fabricated from stainless steel and is generally 2 mm in thickness. When viewed from above the mould 105 is of circular cross-section and can be rotated relative to the vessel 102 by means of a stepping motor 107.

In use, liquid nitrogen is admitted to a heat exchanger 108 via a control valve 109. The liquid nitrogen cools a stream of coolant (SYLTHERM XLT (RTM)) from pipe 110 to $-82°$ C. The cold coolant leaves the heat exchanger 108 through pipe 111 and is admitted to the lower portion 104 of the vessel 102.

It will be noted that the lower portion 104 of the vessel 102 is of substantial volume and this provides a substantially constant low temperature source for cooling the mould 105. The coolant leaves the lower portion 104 of the vessel 102 through pipe 112 and is fed to the inlet of pump 113 which continually circulates coolant through the vessel 102.

The temperature of the coolant in pipes 111 and 112 is measured by temperature sensors 114 and 115 respectively and the control valve 109 is opened and closed as a function of the temperature sensed by the temperature sensor 115 and the difference between temperature sensor 115 and temperature sensor 114.

In use, the apparatus 101 is first cooled by the coolant.

Ice lolly solution is then pumped from chiller 116 by gear pump 117 to a valve 118. When valve 118 is closed the solution passes through pressure relief valve 119 to the chiller 116.

Stepping motor 107 is activated at regular intervals to rotate the mould 105 by a fixed amount. As each set of cavities 106 stops beneath dispenser assembly 120 valve 118 is opened for a fixed period of time during which the cavities 106 are filled to 1 cm from the top.

The ice lolly solution immediately starts to freeze and by the time the cavities 106 have been advanced six times by the stepping motor 107 the ice lolly solution has formed a crust adjacent the cavities 106 although the ice lolly solution in the centre of the cavities 106 is still slushy.

At this time sticks are inserted into the cavities 106 at a stick insertion station (not shown). The sticks penetrate the slushy liquid near the bottom of the cavities 106 and, by the time the sticks are released before the next stepping operation are held securely in place.

After a further ten stepping operations the sticks are gripped and the whole frozen ice lollies withdrawn upwardly from the cavities 106.

The cavities 106 are then re-cooled to their original temperature during the next four stepping operations after which the process is repeated.

The entire process from injection to removal takes 100 seconds.

In order to inhibit ice forming inside the vessel gaseous nitrogen from the heat exchanger 108 is passed through pipe 121 into the upper portion 103 of the vessel 102 and then vented to atmosphere via fan 122 and vent 123.

Whilst the cavities in FIG. 3 are cooled by immersion in coolant it would equally be possible to spray the cavities with sufficient coolant.

Figure 4:
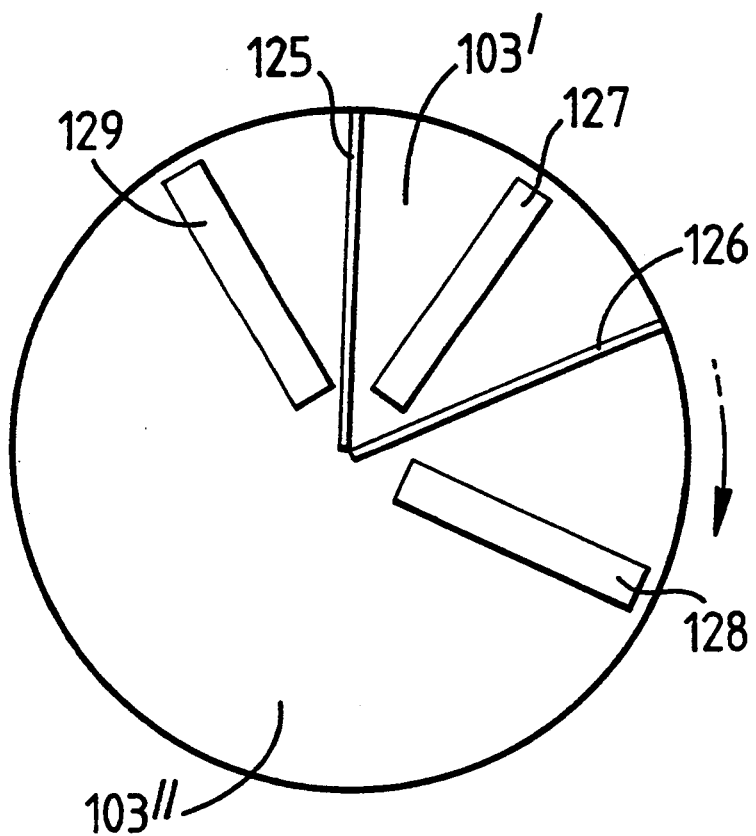
FIG. 4 is a schematic vertical cross-section through a second embodiment of an apparatus in accordance with the invitation.

Turning now to FIG. 4, there is shown an apparatus which is generally similar to the apparatus shown in FIG. 3 except that the lower portion of the apparatus is divided into two zones, one of which 103' uses coolant indirectly cooled by liquid nitrogen and the other of which 103" uses coolant indirectly cooled by a mechanical refrigeration unit (not shown). The zones 103' and 103" are separated by walls 125, 126 and cooling is effected by spraying the coolant in each zone against the cavities as they pass through the zones.

Briefly, as the cavities pass clockwise over wall 125 they are pre-cooled to approximately $-82°$ C. The cavities are then filled with pre-chilled ice lolly solution at filling station 127. The filled cavities are then further cooled by liquid nitrogen cooled coolant until they pass over wall 126. At this point they are cooled by sprays of the same coolant indirectly cooled by a mechanical refrigeration system to a somewhat warmer temperature. Sticks are inserted at stick insertion station 128 and after substantially complete cooling the frozen ice lollies are removed at removal station 129.

By using liquid nitrogen for providing the lower pre-cooling temperature required and mechanical refrigeration for providing the in-depth freezing the overall process becomes extremely attractive.

Figure 5:
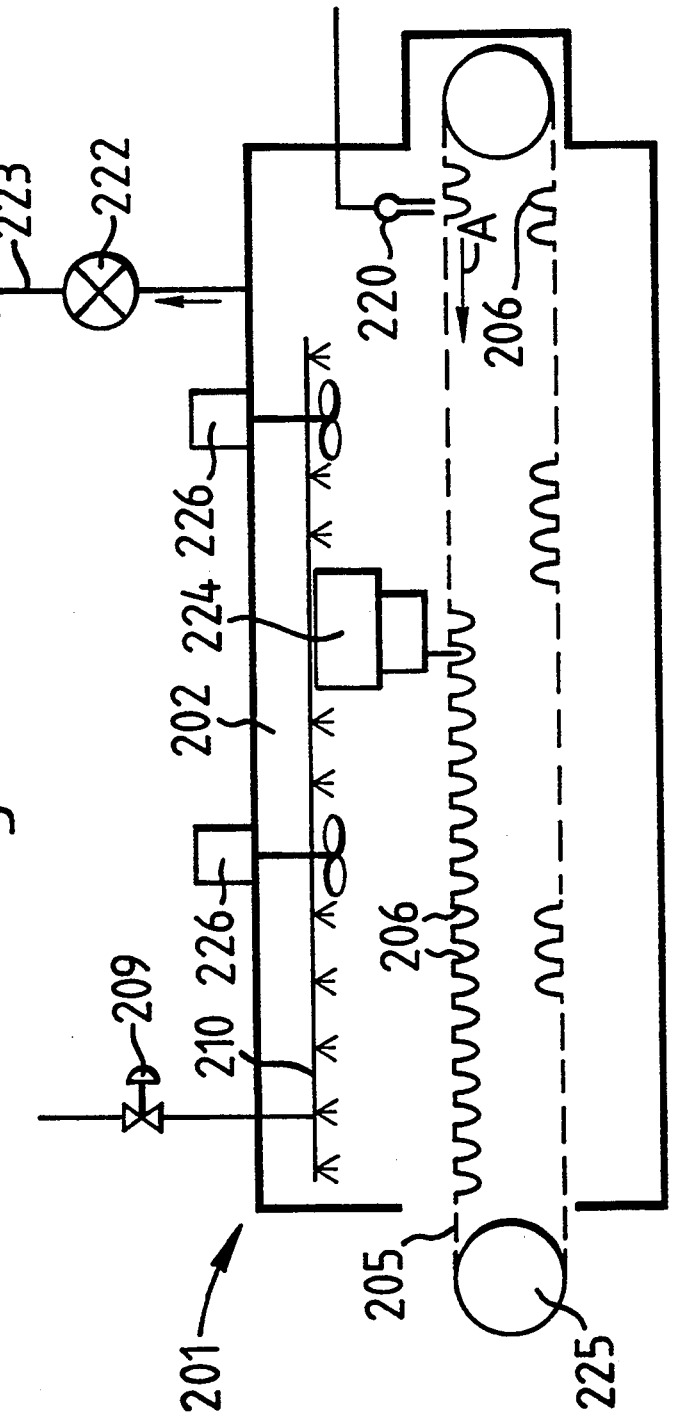
FIG. 5 is a schematic plan view of a third embodiment of an apparatus in accordance with the invention.

Referring now to FIG. 5, there is shown a tunnel freezer which is generally identified by the reference numeral 201.

The tunnel freezer comprises a tunnel 202 having a belt 205 provided with a multiplicity of cavities 206.

In use liquid nitrogen is introduced into the tunnel 202 via valve 209 and spray header 210 to maintain the interior of the tunnel 202 at approximately $-84°$ C.

The cavities 206a are thus at approximately $-84°$ C. as they pass under dispenser assembly 220 which substantially fills the cavities with ice lolly solution.

As the cavities 206 move along the tunnel 202 in the direction of arrow 'A' the liquid immediately adjacent the cavities 206 forms a crust whilst the liquid inside becomes slushy.

At this point a stick inserter 224 inserts sticks into the slush. Freezing is then completed as the cavities pass out of the end of the tunnel 202 where they simply fall out of the cavities as they pass over drive wheel 225.

The tunnel 202 is provided with an extract fan 222 and vent 223. The tunnel 202 is also provided with mixing fans 226 to induce turbulence in the tunnel 202 and thereby enhance heat transfer.

Whilst the apparatus shown in FIG. 3 is intended for producing high quality ice lollies which can be sculptured to some extent the apparatus shown in FIG. 4 is intended for the inexpensive production of simple ice lollies.

In the Examples disclosed the temperatures of the cavities were measured using a thermocouple on the inner surface of the cavity, i.e., the surface which the aqueous liquid contacts.

What is claimed is:

1. A method of freezing an aqueous liquid which method comprises the steps of:
    positioning a mold fabricated from a metal used in freezing of foodstuffs and having a wall thickness of at least 1 mm to receive the aqueous liquid;
    pre-cooling the surface of the mold intended to be contacted by the aqueous liquid to a temperature between $-50°$ C. and $-85°$ C.;
    introducing the aqueous liquid into the mold;
    allowing at least the aqueous liquid in contact with the mold to freeze; and
    releasing said frozen aqueous liquid from the mold.

2. A method according to claim 1, wherein said mould is pre-cooled to a temperature at or colder than −60° C.

3. A method according to claim 1, wherein said mould is not pre-cooled to a temperature lower than −80° C.

4. A method according to claim 3, wherein said mould is pre-cooled to a temperature of from −70° C. to −80° C.

5. A method according to claim 1, wherein at least part of said mould has an average wall thickness of at least 2 mm.

6. A method as claimed in claim 1, wherein said aqueous liquid contains sugar.

7. A method according to claim 1, wherein said aqueous liquid is viscous.

8. A method as claimed in claim 7, wherein said aqueous liquid is liquid chocolate.

9. A method according to claim 1, wherein only the aqueous liquid adjacent the mould is allowed to freeze to form a crust and that said method includes the step of extracting (unfrozen) liquid from said moulds so that said crust forms a shell.

10. A method according to claim 1, wherein said cooling rate in said liquid 1 mm from the interface between said liquid and said mould is at least 650° C./min at least during initial freezing.

11. A method according to claim 10, wherein said cooling rate is at least 750° C./min.

12. A method according to claim 1, wherein the rate of heat transfer subsequent to the formation of an initial frozen crust is maintained at a level sufficient to prevent the thawing of said crust.

13. A method according to claim 1, wherein said mould is inverted to release said frozen liquid from said mould.

14. A method according to claim 13, wherein said mould is jarred to facilitate the release of said frozen liquid.

15. A method according to claim 14, wherein said mould is dropped against a bar as it is inverted to facilitate the release of said frozen liquid.

16. A method according to claim 1, including the step of using mechanical refrigeration to help freeze said aqueous liquid after introduction into said mould.

* * * * *